United States Patent [19]
Nilsson

[11] 3,980,287
[45] Sept. 14, 1976

[54] COMBINATION VISE, V-BLOCK AND DRILL JIG WORKHOLDER

[76] Inventor: J. Charles Nilsson, 43 May St., Poughkeepsie, N.Y. 12601

[22] Filed: Dec. 11, 1975

[21] Appl. No.: 639,925

[52] U.S. Cl. .............................. 269/87.3; 269/88; 269/110; 269/154; 269/155; 269/246; 269/321 N; 408/115 B
[51] Int. Cl.² .......................................... B25B 1/20
[58] Field of Search ............ 269/87.3, 88, 110, 140, 269/141, 154, 155, 246, 321 N; 408/115, 108, 109, 72 B

[56] References Cited
UNITED STATES PATENTS

| 1,772,885 | 8/1930 | Case ..................................... 269/155 |
| 2,455,024 | 11/1948 | Schneider ........................ 269/321 N |
| 3,345,061 | 10/1967 | Schaefer ............................. 269/246 |
| 3,537,337 | 11/1970 | Best .................................... 269/87.3 |
| 3,694,100 | 9/1972 | Blair ................................... 269/87.3 |
| 3,824,744 | 7/1974 | Petrant .......................... 269/321 N |

*Primary Examiner*—Al Lawrence Smith
*Assistant Examiner*—Robert C. Watson
*Attorney, Agent, or Firm*—Joseph L. Spiegel

[57] ABSTRACT

A versatile portable workholder can be used as a vise, a V-block and a drill jig for holding different sized and shaped workpieces. The workholder includes a vise comprising two jaw pieces actuated by a screw member. A clamp can be clamped in the vise and includes a second screw member for clamping a workpiece between the clamp and the vise. A stop member is connectible to the vise for positioning or locating a workpiece relative thereto. The second screw member has a bore and serves as a drill bushing.

9 Claims, 4 Drawing Figures

COMBINATION VISE, V-BLOCK AND DRILL JIG WORKHOLDER

FIELD OF THE INVENTION

This invention relates to a combination workholder that can be used as a vise, a V-block and drill jig for holding different sizes and shapes of workpieces.

PRIOR ART

In many workshops and machine shops, it is customary to use some form of a fixture, jig or workholder for holding a workpiece while it is being worked on. Various forms or types of such workholders are known in the prior art. Many are of a stationary nature and are affixed to or mounted upon a machine tool or a workbench. Such types are disadvantageous because of the limiting effect of a stationary workholder, of the specialized nature of the work to be performed or because different workholders are needed for different types of work to be performed upon the workpiece. Many prior art workholders are specialized as to the type or shape of workpiece for which they are intended to be used. Thus, where several functions are to be performed, different workholders have to be used and the workshop has to stock or keep in inventory such different ones.

As will be more fully appreciated from the description below, the invention involves combining plural holding functions into a single workholder and the closest prior art patents of which I am aware do not disclose any similar plural function workholders. The specific functions are those of a vise, of a V-block and of a drill jig combined with means for locating a workpiece relative thereto. The prior art patents have limited functional capability. U.S. Pat. Nos. 2,744,430-McLaughlin et al; 1,923,967-Brown, Jr.; 1,341,841-Cocks; 1,217,909-Brown; and, 3,307,843-Torossian are directed to different forms of vises, some of which can be used with a drill. U.S. Pat. No. 2,240,230-Schlichting is directed to a simple V-block having a locating structure but no clamping or holding means. U.S. Pat. Nos. 2,556,131-Wolfson; 1,119,470-Swantusch; 3,358,990-Anton; and, 2,822,710-Haiman are directed to V-blocks combined with drill bushings to form drill jigs particularly adapted for drilling or boring into cylindrical workpieces. U.S. Pat. No. 2,535,581-Klingman discloses a drill jig having adjustable members for locating drill bushings over a work piece.

SUMMARY OF THE INVENTION

An object of the invention is to provide a workholder usable as a vise, a V-block and a drill jig.

Another object is to provide a simple, rugged and accurate workholder that is versatile in fuction.

A further object is to provide a multifunction workholder that can be set up to position or locate automatically a workpiece.

Still another object is to provide a workholder that tightly grips a workpiece so that the workpiece can be machined while held thereby.

Other objects and advantages of the invention will be apparent from the following description taken in connection with the accompanying drawing wherein.

DETAILED DESCRIPTION

Figure 1:
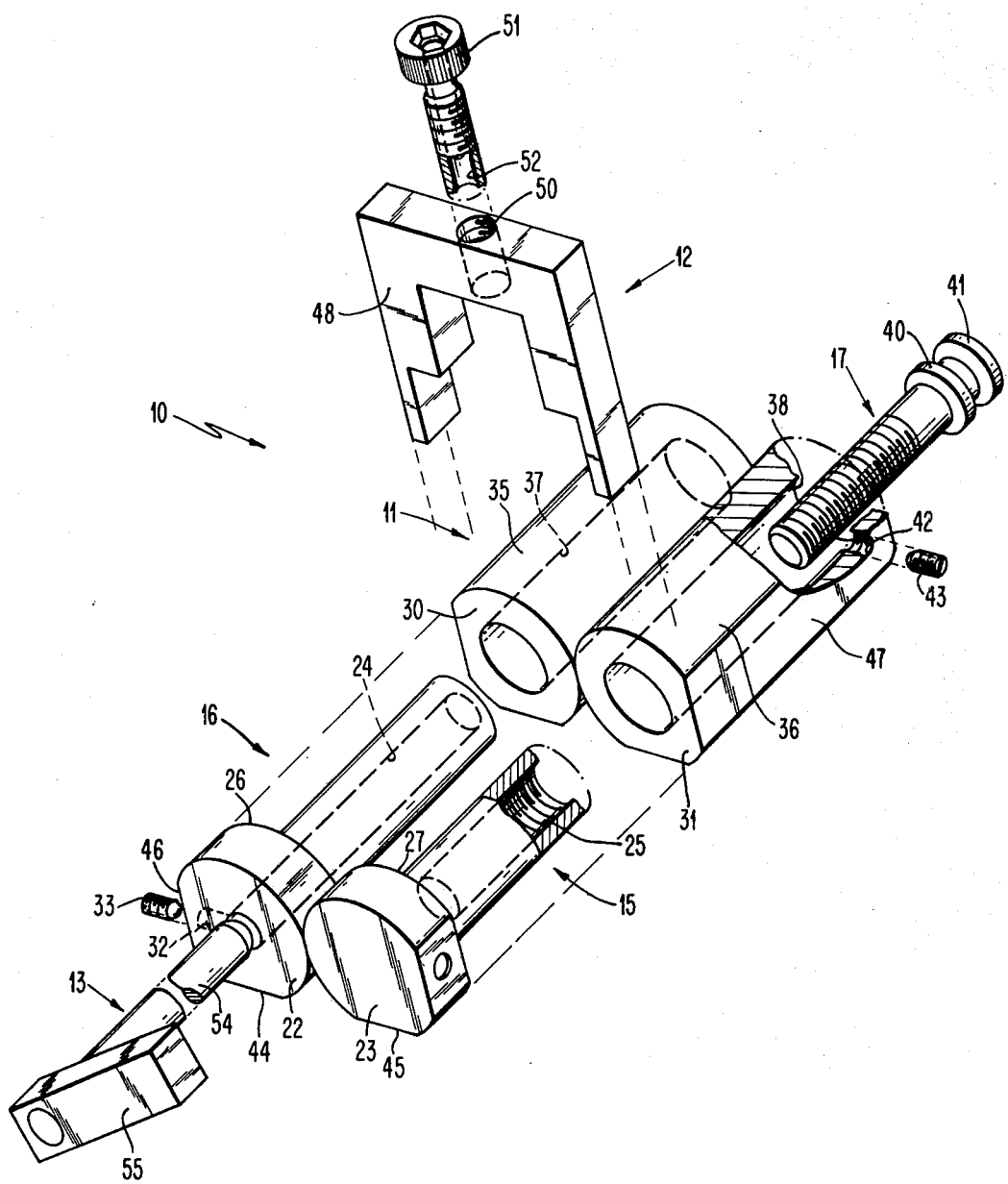
FIG. 1 is an exploded perspective view of the preferred embodiment of the invention.

Referring now to the drawing and first to FIG. 1, there is shown a workholder 10 comprising a vise 11, a clamp 12 and a locator 13. Vise 11 comprises two jaw members 15 and 16 actuated by a screw member 17.

Jaw member 15 comprises two parallel cylindrical rods 20 and 21 of reduced diameter integral with end pieces 22 and 23 of larger diameter. A smooth bore 24 extends axially through rod 20 and end piece 22. Rod 21 has an internally threaded dead-end bore 25. End pieces 22 and 23 are joined as by welding to form jaw member 15 into an integral unit. The inner faces 26 and 27 of pieces 22 and 23 are flat, coplanar and form jaws or jaw faces that cooperate with parallel, flat jaw faces 30 and 31 on jaw member 16. End piece 22 also has a lateral internally threaded bore 32 for receiving an Allen head set screw 33.

Jaw member 16 comprises two parallel, juxtaposed cylindrical members 35 and 36 integrally joined as by welding and having smooth bores 37 and 38 into which rods 20 and 21 extend with a sliding fit. Screw member 17 is threaded into bore 25 of rod 21 and is entirely positioned in bore 38 so that the head of the screw member is flush with the end of the bore but exposed for access. With screw member 17 so enclosed, no dust, grit or chips can fall on same, thus reducing wear and tear. This head has an accessible Allen head socket that allows the screw member to be turned with a suitable wrench. The head also includes two collars or rings 40 and 41 that are axially spaced in alignment with an internally threaded bore 42 which receives an Allen head set screw 43.

The screw projects into bore 38 between collars 40 and 41 to rotatably connect member 17 to member 36 and to prevent any axial movement of screw member 17 relative to jaw member 16. Thus, as screw member 17 is rotated, jaw members 15 and 16 are moved relative to each other in a direction dependent on the direction of rotation. The diameters of ends 22 and 23 and members 35 and 36 are the same, to create an elongated arcuate V-block. The bottoms of these members are ground flat at 44 and 45 and the sides of members 35 and 36 are ground flat at 46 and 47 so that the vise can be positioned horizontally as shown or upright on either of its sides.

Clamp 17 has a U-shaped yoke 48, the cross bar of which has a threaded vertical bore 50 for receiving an Allen head screw 51 provided with a smooth axial bore 52 for receiving and guiding a drill bit so that the screw acts as a drill bushing. Screws 51 with different size bores 52 can be provided to accommodate different drill bit sizes. Clamp 12 is designed to be clamped in vise 11 with the legs of the yoke 48 held between the jaw member faces 26, 27, 30 and 31. The outer faces of the legs of yoke 48 are flat and are coplanar with flat sides 46 and 47 when clamp 12 is mounted in vise 11. Screw 51 is adapted to move vertically along its axis which intersects the axis of a cylindrical workpiece positioned in the V-block on vise 11.

Locator 13 comprises a rod 54 that is elongated and is adapted to be positioned in bore 24. One end of rod 54 is connected to a block shaped member or end 55 that extends at right angles to the rod whereby locator 13 is L-shaped. The length of member 55 is sufficient to extend across the end of a workpiece craddled in the vise. Locator 13 would be locked in the desired position by set screw 33.

Figure 2:
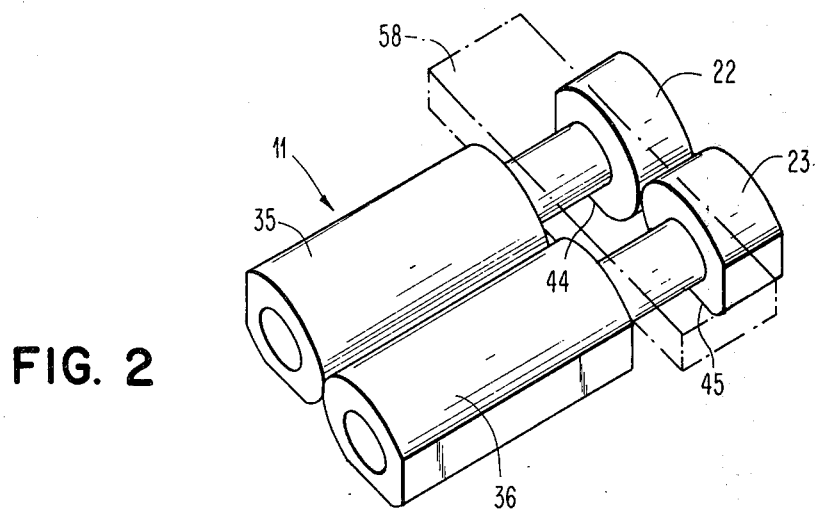
FIG. 2 is a perspective view of the workholder of FIG. 1 when used as a vise.

The use of workholder 10 as a vise to hold a rectangular block of workpiece 58 is shown in FIG. 2. In such function, clamp 12 and locator 13 are not used. To operate as a simple vise, screw member 17 is rotated to move jaw members 15 and 16 apart whereby workpiece 58 can be placed across the tops of rods 20 and 21 between faces 26, 27, 30 and 31. The screw member 17 can then be rotated to move the jaw members towards each other to clamp the workpiece 58 therebetween in the vise 11.

Figure 3:
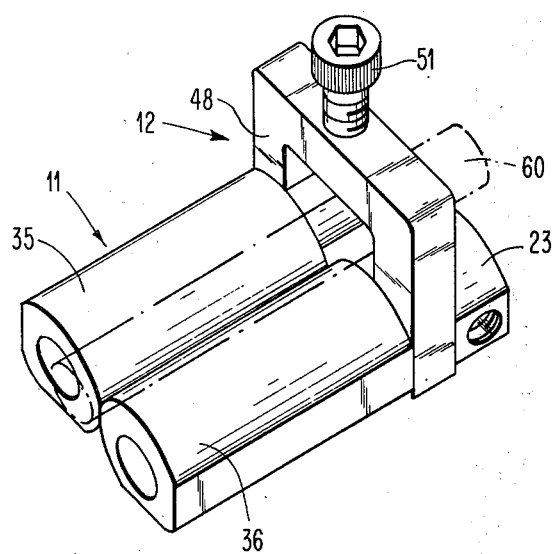
FIG. 3 is a perspective view of the workholder of FIG. 1 when used as a V-block drill jig; and, FIG. 4 is a perspective view of the workholder of FIG. 1 when used as a drill jig having a locator.

Workholder 10 can be used as a simple V-block to horizontally support a cylindrical object 60 by simply placing such an object on top of the vase with its axis parallel to the axes of members 35 and 36. This can be done without use of clamp 12 or with it as shown in FIG. 3. In the latter case, clamp 12 is mounted in vise 11, screw 51 is raised, and the cylindrical workpiece 60 is positioned between the clamp and vise. Screw 51 can then be tightened to clamp workpiece in the workholder. The assemblage could then be used to facilitate drilling a hole in the workpiece by placing a drill bit in bore 52.

Figure 4:
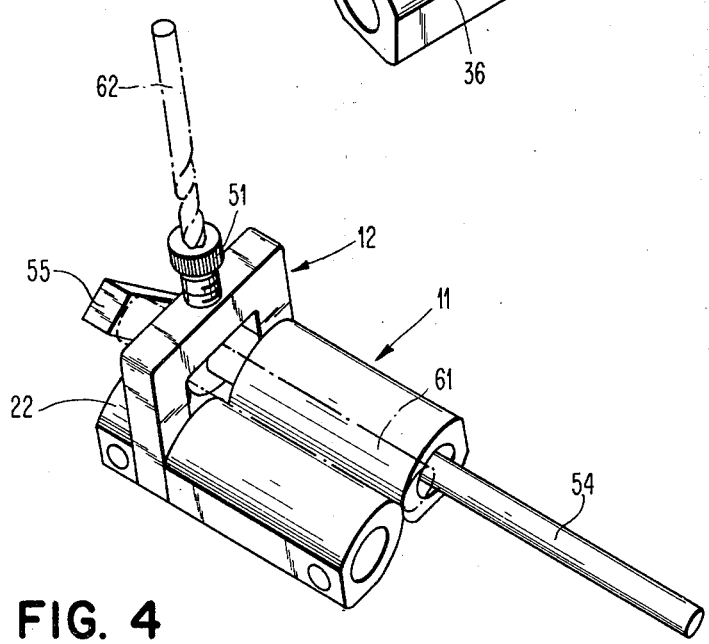

Referring to FIG. 4, the locator 13 is used by placing the rod 54 in bore 24 with member 55 positioned to locate the end face of a cylindrical workpiece 61 at a predetermined position. The locator finds use in drilling holes with a drill bit 62 in different workpieces at the same distance from the ends of the workpieces.

For ruggedness, the parts are preferably made of material, such as steel. The workholder 10 can be made in various sizes for different size workpieces. Preferably, it is of a size that can fit in the palm of a hand for handling small workpieces and which makes it portable whereby a workpiece can be loaded and the assemblage moved around as a unit. The workholder is obviously adapted to a wide variety of used around a shop. It should be apparent that many changes can be made in the details and arrangement of parts by way of addition and omission without departing from the spirit and scope of the invention as defined in the appended claims.

What is claimed is:

1. A workholder comprising:
    a first pair of parallel, cylindrical first and second members rigidly joined in a side-by-side relationship, and having axial first and second bores, said members having flat end faces defining first jaw means;
    a second pair of parallel, cylindrical members rigidly joined in a side-by-side relationship and having flat end faces defining second jaw means disposed parallel to said first jaw means;
    a pair of parallel first and second rods slidably disposed in said first and second bores and rigidly connected to said second pair of said cylindrical members whereby said rods and said second pair are movable as a unit relative to said first pair, said first rod having an internally threaded bore opening into said first bore; and,
    actuating screw means rotatably mounted on said first member in said first bore, said screw means being threadedly engaged with said threaded bore whereby rotation of said screw means is operative to move said first jaw means and said second jaw means relative to each other to thereby develop a clamping and releasing action between said jaw means.

2. The invention defined by claim 1 further including:
    a U-shaped yoke clamped between said first and second jaw means and providing a space in which a cylindrical workpiece can be placed on said cylindrical members beneath the cross leg of said yoke; and,
    second screw means mounted on said yoke and adapted to engage said workpiece to clamp it between said second screw means and said cylindrical members.

3. The invention defined by claim 2 further including:
    a locator comprising a third rod disposed in said second bore and a head attached to one end of said third rod and being adapted to engage one end of said cylindrical workpiece.

4. The invention defined by claim 2 wherein:
    said second screw means has an axial bore extending therethrough and adapted to allow a drill bit to be placed therein for drilling a hole in said workpiece.

5. A portable versatile workholder adapted to separately hold a variety of shapes of workpieces including a cylindrical workpiece, comprising:
    a vise comprising
        first and second jaw members slidably interconnected and having parallel jaws movable relative to each other,
        and first screw means connected to said first and second jaw members and operative in response to rotation thereof to move said members and said jaws relative to each other;
    clamp means connected to said vise and comprising a yoke member having a cross-piece and parallel legs connected to opposite ends of said cross-piece, said legs being clamped between said jaws, said clamp means further comprising second screw means mounted on said cross-piece and operative to clamp a workpiece between said vise and said clamp means, said clamp means being removeable from said vise allowing a workpiece to be held thereby;
    and a locator connected to one of said jaw members and including a head adapted to engage one end of a workpiece positioned between said vise and said clamp means.

6. The invention defined by claim 5 wherein:
    the axis of said second screw means intersects the axis of a cylindrical workpiece clamped thereby, and said second screw means comprises an axial bore adapted to pass a drill bit therethrough.

7. The invention defined by claim 5 wherein:
    said first jaw member comprises first and second cylindrical members rigidly joined in a side-by-side parallel relationship and having coplanar end faces defining one of said jaws, said first and second cylindrical members further having first and second axial bores;
    and said second jaw member comprises first and second rods slidably disposed in said first and second bores, and an end piece rigidly interconnecting said rods and having flat face means parallel to said end faces and defining the other of said jaws.

8. The invention defined by claim 7 wherein:
    said first rod has a threaded axial bore; and,
    said first screw means is disposed entirely within said first bore and has a threaded end screwed into said threaded axial bore, and a head having an accessible recessed wrench socket, said head being rotatably connected to said first cylindrical member.

9. The invention defined by claim 7 wherein:
said jaw members have flat laterally facing sides allowing said workholder to be placed on one of such sides on a flat surface; and,
said legs of said yoke have flat sides coplanar with said sides of said jaw members.

* * * * *